US012602342B2

(12) United States Patent
Abdouch et al.

(10) Patent No.: US 12,602,342 B2
(45) Date of Patent: Apr. 14, 2026

(54) SMALL FORM FACTOR PC WITH BMC AND EXTENDED FUNCTIONALITY

(71) Applicant: SIMPLY NUC, INC., Round Rock, TX (US)

(72) Inventors: Charles Abdouch, Round Rock, TX (US); Joseph Giannuzzi, Cedar Park, TX (US); Steven Savage, Florence, TX (US)

(73) Assignee: SIMPLY NUC, INC., Round Rock, TX (US)

( * ) Notice: Subject to any disclaimer, the term of this patent is extended or adjusted under 35 U.S.C. 154(b) by 0 days.

(21) Appl. No.: 18/999,493

(22) Filed: Dec. 23, 2024

(65) Prior Publication Data

US 2025/0245182 A1      Jul. 31, 2025

Related U.S. Application Data

(60) Provisional application No. 63/625,863, filed on Jan. 26, 2024.

(51) Int. Cl.
*G06F 13/14* (2006.01)
*G06F 13/40* (2006.01)

(52) U.S. Cl.
CPC ...... *G06F 13/4068* (2013.01); *G06F 2213/40* (2013.01)

(58) Field of Classification Search
CPC ......................... G06F 13/4068; G06F 2213/40
See application file for complete search history.

(56) References Cited

U.S. PATENT DOCUMENTS

| | | | | |
|---|---|---|---|---|
| 11,113,046 | B1* | 9/2021 | Bowen | G06F 9/485 |
| 2018/0248749 | A1* | 8/2018 | Chou | H04L 12/4641 |
| 2021/0048863 | A1* | 2/2021 | Rahardjo | G06F 1/189 |
| 2021/0049059 | A1* | 2/2021 | Bisa | G06F 11/0793 |
| 2024/0107701 | A1* | 3/2024 | Abdouch | H05K 7/20172 |

OTHER PUBLICATIONS

PCT/US25/13079 International Search Report mailed Mar. 5, 2025.

* cited by examiner

*Primary Examiner* — Henry Tsai
*Assistant Examiner* — Kim T Huynh
(74) *Attorney, Agent, or Firm* — Kunzler Bean & Adamson

(57) ABSTRACT

Apparatuses, methods, and systems are disclosed for a small form factor PC with BMC and extensible functionality. An apparatus includes a processor, memory, and a BMC that is configured for installation in a small form factor device and wherein functionality of the BMC is configurable by way of extensible features for interfacing with at least one device communicatively connected to the apparatus.

23 Claims, 8 Drawing Sheets

200

202

204

206

205

208

210

SMALL FORM FACTOR PC WITH BMC AND EXTENDED FUNCTIONALITY

CROSS-REFERENCE TO RELATED APPLICATIONS

This application claims the benefit of U.S. Provisional Patent Application No. 63/625,863 entitled "SMALL FORM FACTOR PC WITH BMC AND EXTENDED FUNCTION-ALITY" and filed on Jan. 26, 2024, for Charles Abdouch et al., which is incorporated herein by reference.

FIELD

This invention relates to computers and more particularly relates to a small form factor PC that includes a baseboard management controller (BMC) with extensible functionality.

BACKGROUND

Computing devices can be used to perform various functions. Some computing devices are utilized for personal usage or can be used in business or corporate settings. Moreover, computing devices may be in communication with other computing devices via one or more networks to form a larger connected system.

BRIEF SUMMARY

Apparatuses, methods, and systems are disclosed for a small form factor PC with BMC and extensible functionality. In one embodiment, an apparatus includes a processor, memory, and a BMC that is configured for installation in a small form factor device and wherein functionality of the BMC is configurable by way of extensible features for interfacing with at least one device communicatively connected to the apparatus.

In one embodiment, a method includes providing a small form factor device with a BMC, wherein functionality of the BMC is configurable by way of extensible features for interfacing with at least one device communicatively connected to the small form factor device.

In one embodiment, a system includes at least one sensor or control device, a processor, memory, and a BMC that is configured for installation in a small form factor device and wherein functionality of the BMC is configurable by way of extensible features for interfacing with the at least one sensor or control device.

BRIEF DESCRIPTION OF THE DRAWINGS

In order that the advantages of the embodiments of the subject disclosure will be readily understood, a more particular description of the embodiments will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
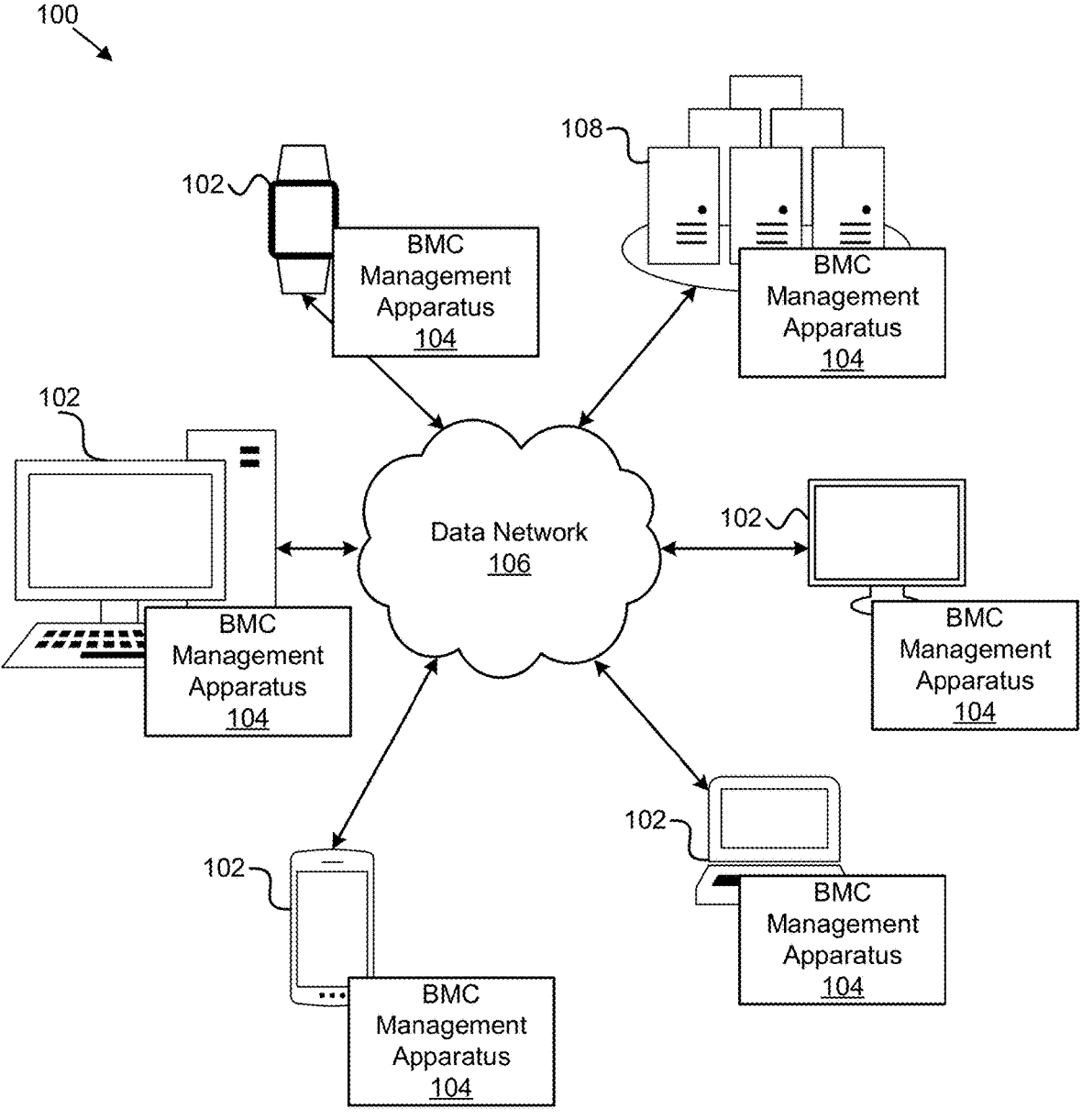
FIG. 1 depicts one embodiment of a system for BMC management in accordance with the subject matter disclosed herein.

The subject matter described herein is directed to a small form factor PC that includes a BMC. The small form factor PC may be located at an edge of a network and may be connected to other small form factor PCs, e.g., in a cluster. The BMC may have extensible functionality and may allow remote access, management, and control of the small form factor PC. The implementation of a small form factor PC with an extensible BMC provides a unique solution in function and size by lowering power consumption and being more efficient. The small form factor PC is easier to deploy in a wider range of physical areas with limited space and enables a wider range of usage models.

The following terminology will be used and referred herein to better describe the primary embodiment and usage models of a BMC for the solutions described herein. The BMC, in certain embodiments, takes one of two forms-a system on module (SOM) or a module connected, coupled, or integrated within a small form factor PC.

As used herein, a BMC may refer to an electronic device that is integrated with or connected to (e.g., on a printed circuit board (PCB) or cabled to the PCB) a target PC and provides the ability to remotely control the target PC from another PC, which may not physically be in the same location, by way of a network interface. A BMC may be a smaller specialized processor that allows a system administrator to remotely monitor and manage a server's hardware components, sensors, or other devices.

The BMC may be a dedicated processor circuit, operating independently from, but monitoring the health and operation of, the computer it is contained in, which may be referred to as the "host." The BMC may be on a separate, self-contained miniaturized module. In most cases, the host is unaware that it is being monitored and controlled by the BMC. The BMC can power the host on and off and force it to restart its operation. The BMC monitors various settings or characteristics of the host, including the temperatures inside the host as well as the host processor. The BMC may have a dedicated network port, e.g., an Ethernet port or wireless networking port (Wi-Fi or Bluetooth), which the BMC can use to support remote connections to the BMC for the management of the host, as well as for access to the host.

The BMC may be connected to one of the host's USB ports (or other serial or expansion port) and can emulate a flash drive or other external storage device for the host. This may allow a remote user to present an operating system (OS) image, OS installer, applications, or data that is local to the remote user, but not local to the host, to appear to be connected to the host via the USB Port on the host. This allows installing an OS or applications remotely or giving the host access to data that is not stored locally on the host. This also allows the host to save data remotely to the remote user's device through the USB port to the BMC and across the network.

Conventionally, BMCs may be used in large data center servers; however, due to the size, complexity, and cost of the BMC, they are not feasible for personal computers (PCs) such as small form factor PCs. Thus, as described herein, to accommodate a small form factor PC configuration to include a BMC, the BMC circuit board may be designed to be less than 3.0 square inches, e.g., 1.4 square inches. The smaller form factor may necessitate designing smaller components that would not normally be in a BMC configuration to fit on a circuit board that may be around 30 mm×30 mm in size, e.g., 30.3 mm×29.5 mm for instance. Also, custom firmware has been developed for the smaller BMC configuration, to extend, increase, add to, customize, or the like the functionality of the BMC (as described in more detail below).

As used herein, a small form factor PC may refer to a non-server, non-industrial, or non-embedded PC comprising, but not limited to a processor, storage, and memory enabled with network connectivity. Such as, but not limited to, a next unit computing (NUC) device, e.g., a device that has a unit volume that does not exceed a determined threshold (e.g., 0.4-1.0 liters, 0.5 liters, 1.0 liters, etc.). For example, a small form factor PC may have a unit volume defined by 5.76 inches×5.35 inches×38 millimeters.

As it relates to size, computers are rated in size by the volume of liters their chassis would hold if it were a container. For instance, a rack-mounted server is typically 25 liters or more, a desktop PC is typically 35 liters, a small form factor PC is typically less than 25 liters, and a Mini-PC is typically 5 liters maximum. The subject matter herein describes a small form factor PC that includes a specially-configured BMC that is capable of extending the feature set of the host through various extensible features and functions. In other words, the BMC may be customized by the end user or application to add, remove, or modify features that go beyond conventional or default BMC configurations.

Figures 7A, 7B:
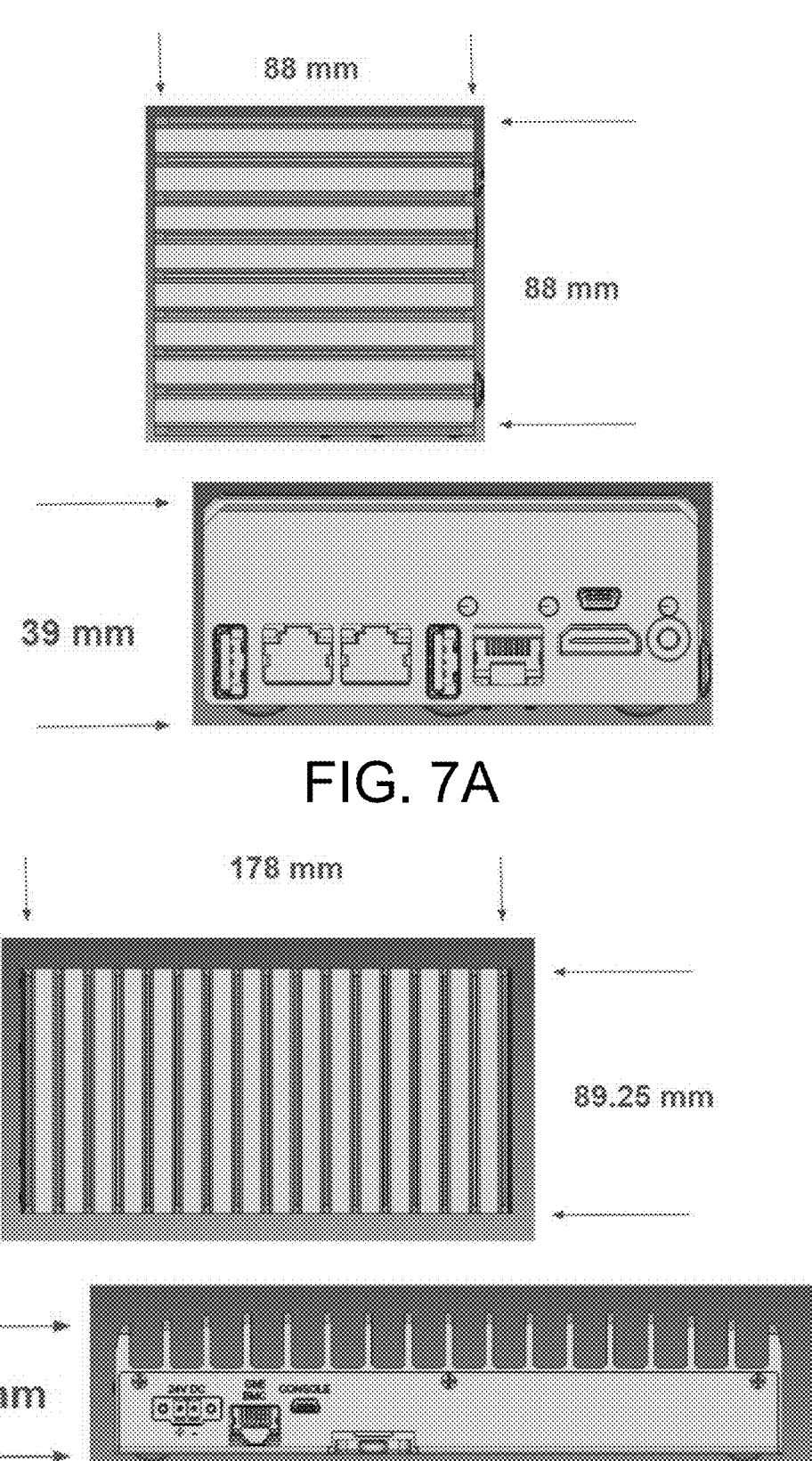
FIG. 7A illustrates one embodiment of a small form factor PC, showing a top view and a side view.
FIG. 7B illustrates one embodiment of a small form factor PC, showing a top view and a side view.

A small form factor PC is typically described in the industry as a system of a size in the range as detailed in FIGS. 7A and 7B. Small form factor PCs are generally portable and can also be integrated in areas with a smaller overall footprint, e.g., limited space, and at the network edge, e.g., as a deployed cluster of smaller form factor servers. Small form factor PCs can be physically mounted near target areas where the usage model requires. One example would be to install small form factor PCs where a cluster of cameras are needed for security or monitoring of critical functions.

As used herein, an edge device may refer to a computing device, e.g., a small form factor PC, that is physically located at the outer edge of a series of networks and other devices nearest the end user. An edge device may not be contained within a centralized control center or server complex inside a firewall.

As used herein, a BMC SOM may refer to a separate electronic device mounted on a PCB carrier that is externally wired to a target PC, via a cable interface, that provides for remote control of the target PC.

As used herein, a BMC module may refer to a self-contained device integrated into a motherboard of the target PC system that is internally routed or wired to a target PC that provides for remote control of a target PC.

For simplicity herein, references to a BMC may refer to both a BMC SOM and an integrated BMC module, unless otherwise noted.

As used herein, a PCB may refer to a printed circuit board, typically comprising a layered stack of FR-4/fiberglass material that includes etched traces with copper and/or gold for the interconnection of an array of electronic devices such as a surface mount technology resistor, capacitor, and other devices.

As used herein, a general purpose input/output (GPIO) may refer to a physical interface that exposes general purpose I/O connections or pins to facilitate the interconnection of signals that trigger events, or communications from external devices. GPIO interconnection to and from internally integrated devices can also be facilitated.

A BMC may be configured for remote control of a target PC's base operational processes such as power on, power off, detection of a system hang or error, the updating of the target small form factor PC system's basic input/output system (BIOS), or the like. Additionally, it may also be in communication with various sensors, such as a temperature sensor, for detecting various triggers and/or events. In certain embodiments, BMC-equipped systems are typically integrated within a contained server complex within the edge or a firewall, such as a corporate firewall.

FIG. 1 is a schematic block diagram illustrating one embodiment of a system 100 for techniques for an overhead camera. In one embodiment, the system 100 includes one or more information handling devices 102, one or more BMC management apparatuses 104, one or more data networks 106, and one or more servers 108. In certain embodiments, even though a specific number of information handling devices 102, BMC management apparatuses 104, data networks 106, and servers 108 are depicted in FIG. 1, one of skill in the art will recognize, in light of this disclosure, that any number of information handling devices 102, BMC management apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a micro-controller, and/or another semiconductor integrated circuit device), a volatile memory, and/or a non-volatile storage medium, a display, a connection to a display, and/or the like.

In general, in one embodiment, the BMC management apparatus 104 is configured to provide access to a BMC for configuration, extending functionality, customization, maintenance, monitoring, control, and/or the like of various devices connected to the BMC and/or the device that controls the BMC. In certain embodiments, the BMC management apparatus 104 is located on a device at the edge of a network and is specially configured to manage a BMC for performing various functions at the edge. However, the small form factor PC with the BMC may be utilized in various system architectures, designs, infrastructures, or the like (e.g., behind a corporate firewall), not just as an edge device. The BMC management apparatus 104 may be part of a software enablement layer, a firmware, or may be a standalone hardware component that configures the BMC for a device.

In certain embodiments, the BMC management apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the BMC management apparatus 104 may include a power interface, a wired and/or wireless network interface, a graphical interface that attaches to a display, and/or a semiconductor integrated circuit device as described below, configured to perform the functions described herein with regard to the BMC management apparatus 104.

The BMC management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the BMC management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the BMC management apparatus 104.

The semiconductor integrated circuit device or other hardware appliance of the BMC management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the BMC management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to execute or run machine learning algorithms, programs, applications, processes, and/or the like.

Figure 2A:
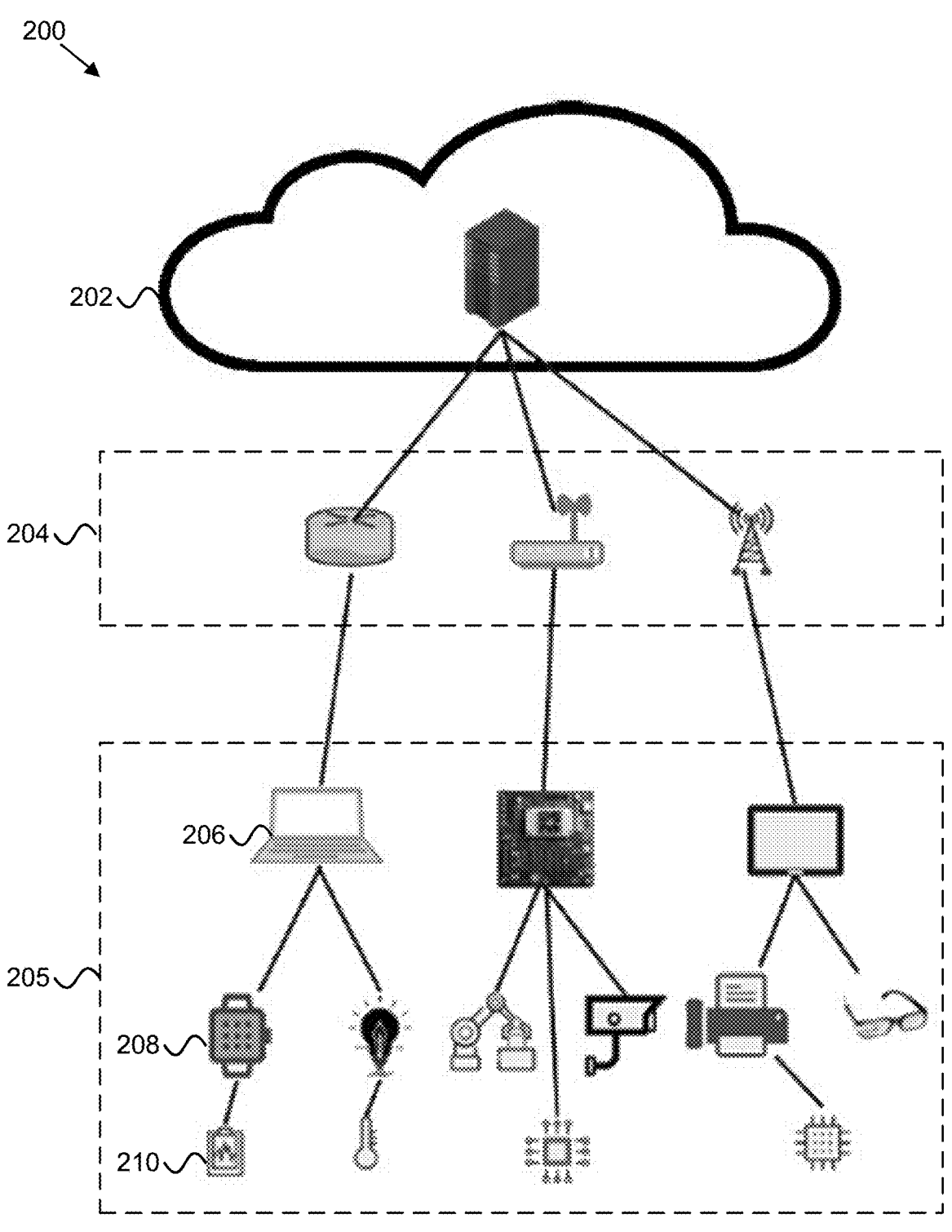
FIG. 2A depicts one embodiment of another system for BMC management in accordance with the subject matter disclosed herein.

FIG. 2A depicts one embodiment of an edge computing system 200. In one embodiment, the edge computing system 200 includes a cloud layer 202, a network layer 204, an edge layer 205 that includes edge devices 206 (such as the small form factor PC described herein) and downstream devices 208/210 such as Internet of Things devices, sensors, control devices, and/or the like.

As used herein, an edge computing system is a distributed computing model that brings computation and data storage closer to the sources of data. More broadly, it refers to a design that pushes computation physically closer to a user, to reduce the latency compared to when an application runs on a centralized data center.

For instance, in the depicted edge computing system, the cloud layer 202 may include remote computing infrastructures such as data centers. The cloud layer 202 may be communicatively coupled to a network layer 204 that provides remote access to the cloud layer 202. The network layer 204 may include various network equipment and infrastructure such as cellular base stations, routers, switches, Internet service providers, satellites, and/or the like.

In one embodiment, the edge layer 205 includes edge devices 206 that provide access to the network layer 204 and ultimately the cloud layer 202. The edge devices 206 may include the small form factor PC described herein, with a BMC that has extendable functionality, which is communicatively coupled with one or more downstream devices 208/210 such as sensors, control devices, and/or the like.

The sensors may include temperature sensors, motion sensors, light sensors, pressure sensors, and/or the like. The control devices may include a relay, an actuator, a dimming controller, or Internet of Things devices such as light controls, appliances, and/or the like.

Figure 2B:
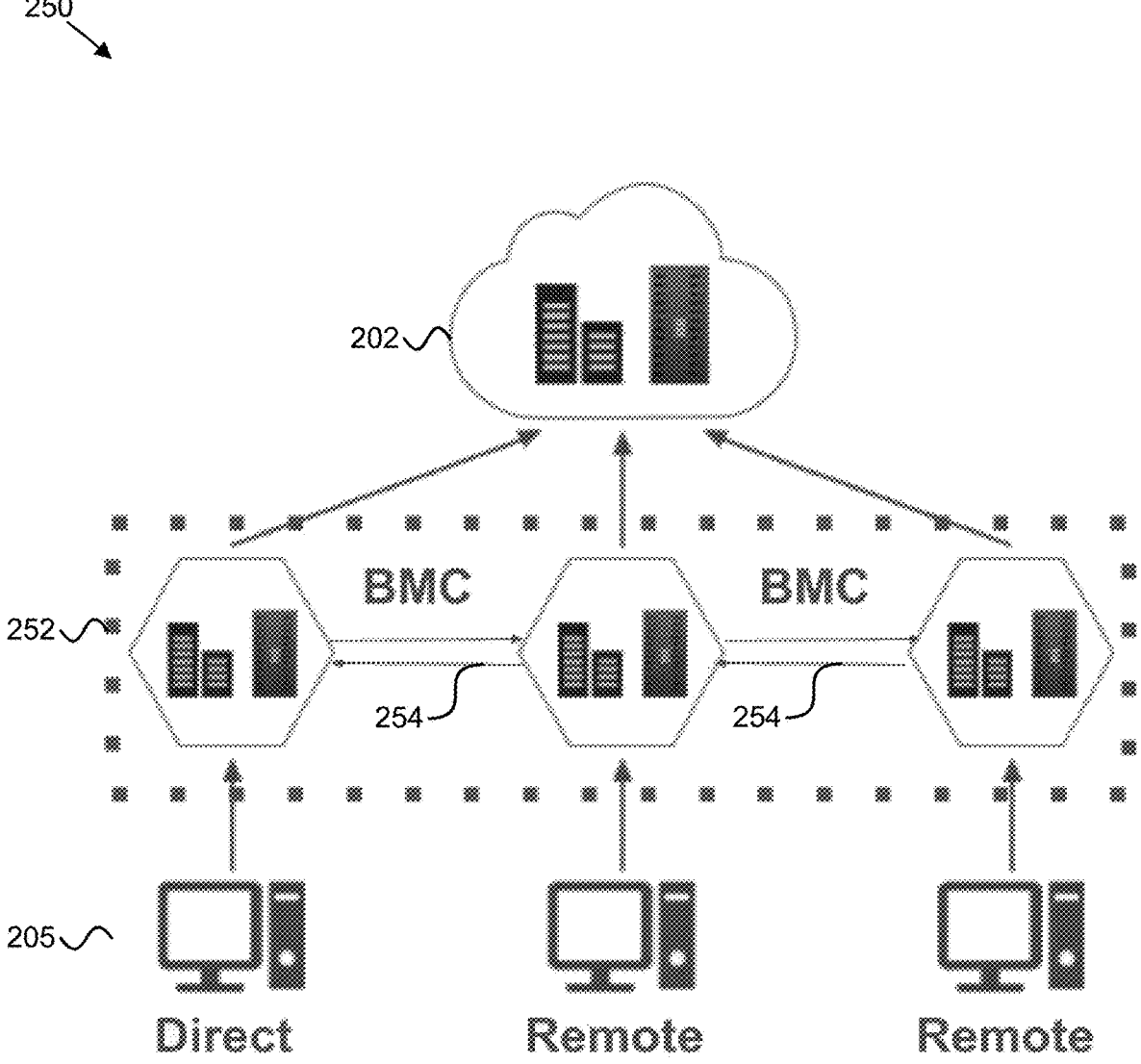
FIG. 2B depicts one embodiment of another system for BMC management in accordance with the subject matter disclosed herein.

FIG. 2B depicts another embodiment of an edge computing system 250. In the depicted embodiment, the edge computing system 250 includes an embodiment of an edge cloud 252. The edge cloud 252 is configured using interconnections 254 between BMCs of the different network devices in the edge cloud 252. The interconnections 254, for instance, may include network connections such as wired or wireless connections, and/or cellular network connections such as a long term evolution (LTE) connection.

In one embodiment, the BMC is configured to perform various artificial intelligence/machine learning functions/applications within the edge cloud to enhance the functionality of the edge cloud and the network in general. The AI functions/applications may include security functions, monitoring functions, reporting functions, and/or the like, at the edge.

Figure 3A:
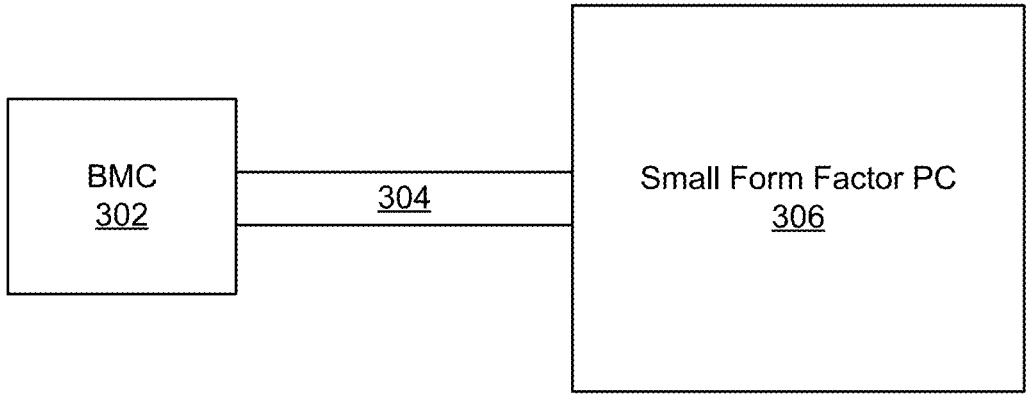
FIG. 3A depicts one embodiment of a BMC connection for BMC management in accordance with the subject matter disclosed herein.

FIG. 3A depicts one embodiment of a BMC 302 embodied as a separate device (e.g., a BMC SOM) that is cabled/interconnected (e.g., via an RJ-45 connection 304) to the target system (e.g., a small form factor PC 306) by a front panel header.

In one embodiment, a small form factor PC 306 may be connected to a BMC 302. The BMC 302 may provide for the core components of an embedded processing system, including a processor core communication interface and local memory mounted on a PCB carrier connected via external wiring to the target PC to be controlled. In one embodiment, the BMC 302 is configured for monitoring/control of a power supply unit's (PSU) output power/wattage level as indicated by way of an embedded data feature such as but not limited to a 1-wire interface and/or the reporting of said parameter(s).

Figure 3B:
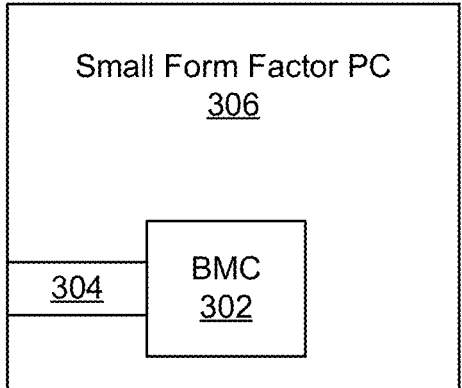
FIG. 3B depicts one embodiment of a BMC connection for BMC management in accordance with the subject matter disclosed herein.

FIG. 3B depicts one embodiment of a BMC 302 as a fully integrated device connected to (e.g., soldered to) the target PC motherboard. In one embodiment, a BMC 302 and its functionality can also come in the form of a singular package contained within an RJ-45 connector 304.

In one embodiment, a small form factor PC 306 may be connected to an external or pluggable BMC 302 via an RJ-45 connector 304 (e.g., a self-contained package electronically connected via internal routing within a PCB) or an RJ-45 connector of the PC with the BMC functionality integrated or within a sub-component of the target PC's RJ-45 connector assembly or similar mechanical package/carrier.

In one embodiment, a small form factor PC 306 may include a BMC 302, including complementary software/coding that extends the remote control functionality of a given BMC implementation. Further, in one embodiment, the small form factor PC 306 and/or the BMC 302 consists of a dynamically reconfigurable set of software/code that allows for the remote connections to downstream and/or upstream devices integrated with and/or externally connected to the small form factor PC 306 and/or the BMC 302. Such an embodiment leverages the device's communication protocols mapped to the target system's GPIO interface type such as, but not limited to, existing communication interface types, e.g., 1-Wire, 2-Wire, or inter-integrated circuit (I2C) communication protocols and other devices and/or features that are not typically connected to the host PC that can be connected to and controlled by the BMC 302 to expose additional functionality, described below.

In one embodiment, due to the small form factor of the PC, the BMC is specially designed to be smaller and consume less power compared with traditional BMCs, which allows for a more compact and energy-efficient solution. For instance, traditional BMC device wattage can reach 8 or more watts, which is significantly higher than the 2.5 watts of power that the BMC described herein consumes.

In one embodiment, the BMC includes a GPIO interface for dynamically enabling extensible functions through programmable pin assignments for the at least one device that is communicatively connected to the BMC, or the device that is controlling the BMC. For instance, each GPIO pin can be assigned a specific function, such as a digital input, digital output, or pulse width modulation (PWM) output, which enables a wide range of capabilities for controlling external devices such as sensors, actuators, light emitting diodes (LEDs), or any other electronic components that can be controlled through digital signals. For example, digital signals can be sent through the GPIO pins, to turn on/off LEDs, activate relays, or control motors connected to the external devices.

The combination of a BMC with extensible functionality and a GPIO interface provides a solution for managing and monitoring a small form factor PC. The BMC handles high-level tasks like system monitoring and remote management, while the GPIO interface provides flexibility for low-level control and interaction with various external devices.

In one embodiment, the BMC functionality can be triggered, monitored, controlled, configured, or the like via a cellular interface, such as an LTE interface. In such an embodiment, the LTE interface enables a one-to-one or one-to-many system connection, which allows for real-time, dynamic triggering, monitoring, and control of the BMC functions from one system to another.

In one embodiment, the small form factor PC and/or the BMC is connected to a backup power system. The backup power system may be configured to maintain power to one or more components of the small form factor PC, e.g., a BMC, a network device, or the like in the event of a power failure.

In such an embodiment, the backup power system may include an externally attached battery backup module, e.g., an uninterruptible power supply or other external battery system that is connected to the small form factor PC through a secondary power input port, e.g., a USB port, a different power port, a serial port, or the like. In one embodiment, the backup power system may include a power of Ethernet (POE) system that provides power over an Ethernet (e.g., an RJ-45 cable), or other network cabling.

Figure 4:
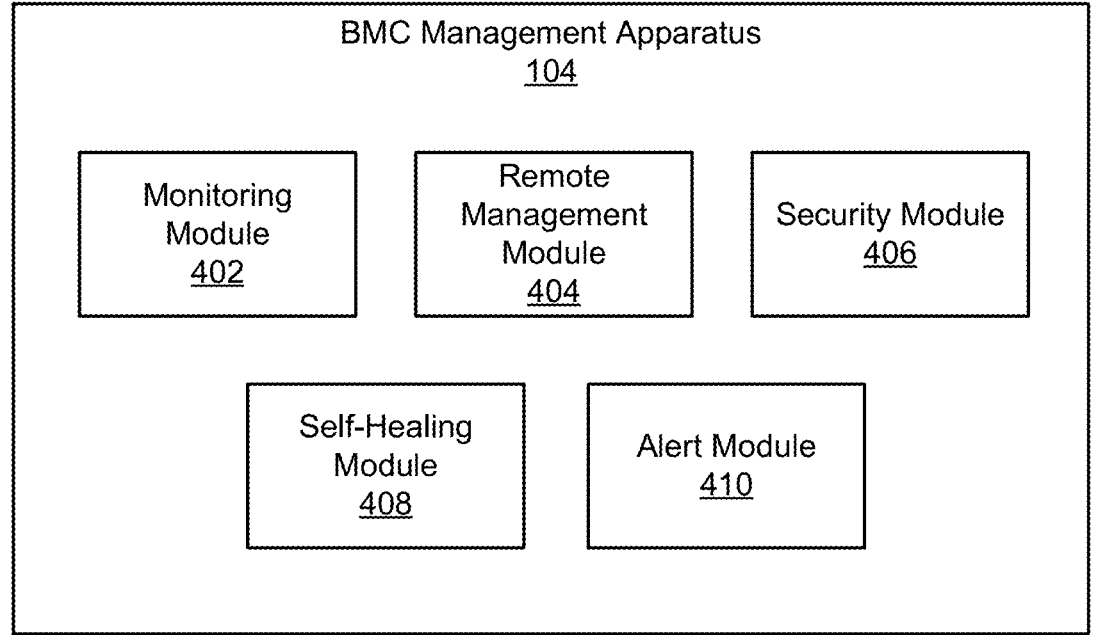
FIG. 4 depicts one embodiment of an apparatus for BMC management in accordance with the subject matter disclosed herein.

FIG. 4 depicts one embodiment of an apparatus for BMC management and extendibility. In one embodiment, the apparatus includes an instance of a BMC management apparatus 104. The BMC management apparatus 104, in one embodiment, includes a monitoring module 402, a remote management module 404, a security module 406, a self-healing module 408, and an alert module 410.

As described above, functionality of the BMC, either as a pluggable module/device or as an integrated component in the small form factor PC, may be extensible, customized, or otherwise configured by a user, an application, a program, a system, or the like, such that the small form factor PC can be customized to perform various functions at an edge of the system, e.g., in response to triggers from downstream devices, in response to commands from upstream devices, based on user input, and/or the like. For example, the BMC may be configured, customized, programmed, or the like to externally expose features or functionality such as keyboard/video/mouse (KVM) functionality for a host device. In one embodiment, the functionality of the BMC is configurable or extensible via an application programming interface (API), a command line interface (CLI), a graphical user interface (GUI), and/or the like.

In such an embodiment, the BMC management apparatus 104 may be accessible via an API enablement layer, e.g., a software layer such as a firmware, driver, application, or other program for controlling/configuring the BMC. In one embodiment, the API enablement layer acts as an intermediary that allows different software programs to communicate and exchange data. The API enablement layer, for instance, facilitates the integration of the small form factor PC with other systems or even other BMCs, which enables communication and collaboration between these systems for various purposes.

In another embodiment, API enablement layer allows developers to create new programs that leverage the functionalities of the BMC and the small form factor PC. For instance, BMCs from multiple small form factor PCs can communicate with each other for sharing sensor data, coordinating control actions, or distributing processing workloads. In another example, the small form factor PC with its BMC can communicate with other computer systems for data exchange, remote management, or collaborative processing tasks. In another example, multiple systems can work together to collect, store, and analyze large amounts of data or when faced with demanding processing tasks, the small form factor PC can leverage the processing power of another system through the API enablement layer. The API enablement layer may also allow for configuration of the BMC to perform custom AI applications/functions as it relates to monitoring, security, reporting, or the like.

In one embodiment, the monitoring module 402 is configured to monitor at least one system parameter. The system parameter may be a parameter, setting, or the like for the device controlling the BMC or for an upstream or downstream device communicatively connected to the BMC. The system parameter, for example, may include a voltage, power, fan speed, temperature, component health, and/or the like. Based on the parameter value, the BMC may perform various actions such as triggering a fan or changing a fan speed, sending a notification/alert/error/status message, and/or the like.

In one embodiment, the remote management module 404 is configured to provide remote access to the device controlling the BMC or for an upstream or downstream device communicatively connected to the BMC. The remote access may be used for configuration, troubleshooting, updates, and/or the like of the device controlling the BMC or for an upstream or downstream device communicatively connected to the BMC. For instance, a user may push updates, configurations, settings, and/or the like to a device associated with the BMC via an interface with the BMC.

In one embodiment, the security module 406 is configured to provide security features such as secure boot capability, intrusion detection, remote data encryption and decryption, and/or the like. In one embodiment, intrusion detection comprises detecting unauthorized access, data breaches, system damage, or a combination thereof and triggering at least one mitigation action including an alert message.

In such an embodiment, the BMC may manage or configure the security module 406 to perform various security actions, described above. For instance, the BMC may coordinate schedules, directories or drives to be monitored/checked, encryption/decryption algorithms to be used, notifications to be sent, and/or the like. The BMC may be configured remotely to perform/manage the associated security functions with the security module 406.

In one embodiment, the self-healing module 408 is configured to perform one or more self-healing actions in response to a trigger, event, or the like, e.g., from the system, from the BMC, or the like associated with a single system, a plurality of BMC interconnected systems, and/or the like. The self-healing actions may include a system shutdown, a system restart, or the like in response to a trigger such as a power surge, a temperature surge, a period of no activity, and/or the like.

For example, a self-healing module 408 may check the status of a BMC at initial power-on, at run-time, or the like (e.g., the BMC may indicate a normal status, an error status, a warning status, or the like), and may also start a timer. When the timer expires, the self-healing module 408 may check the status of the BMC again to see if the state of the BMC has changed. If there is a difference in the BMC status, e.g., if the status goes from a normal operating state to an error state, then the self-healing module 408 may cache BMC data (e.g., critical data) and reset the BMC, e.g., to an initial state or a predetermined state. If the BMC status is the same or better (e.g., going from a warning status to a normal status), then the self-healing module 408 will reset the timer.

In one embodiment, the alert module 410 is configured to provide an auto-alert mechanism to alert other systems or devices that a task, critical function, program, or the like was completed such as the completion of a data analysis cycle. In one embodiment, the alert may trigger various actions such as a data caching event. In one embodiment, the alert module 410 may generate alerts in response to various triggers such as exceeding functional runtime parameters including central processing unit (CPU) throttling.

Figure 5:
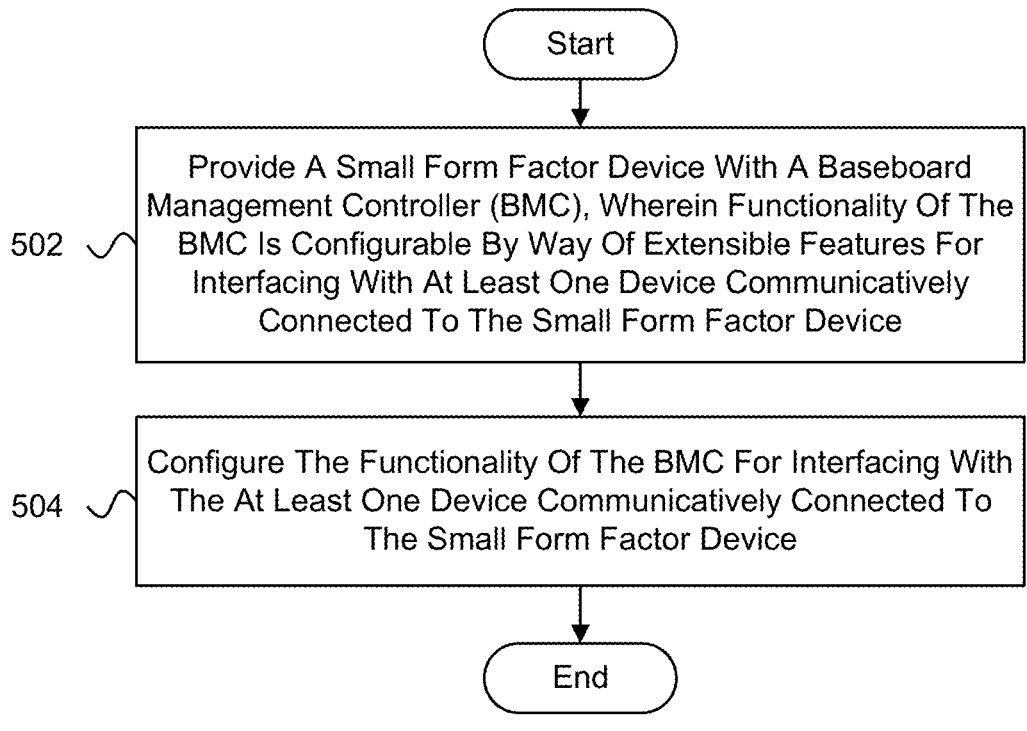
FIG. 5 depicts one embodiment of a method for BMC management in accordance with the subject matter disclosed herein.

FIG. 5 depicts one embodiment of a method for BMC management. In one embodiment, the method is performed by a BMC, a BMC management apparatus 104, a small form factor PC, and/or the like. In one embodiment, the method begins and provides 502 a small form factor device with a BMC, wherein functionality of the BMC is configurable by way of extensible features for interfacing with at least one device communicatively connected to the small form factor device. In one embodiment, the method configures 504 the functionality of the BMC for interfacing with the at least one device communicatively connected to the small form factor device, and the method ends.

Figure 6:
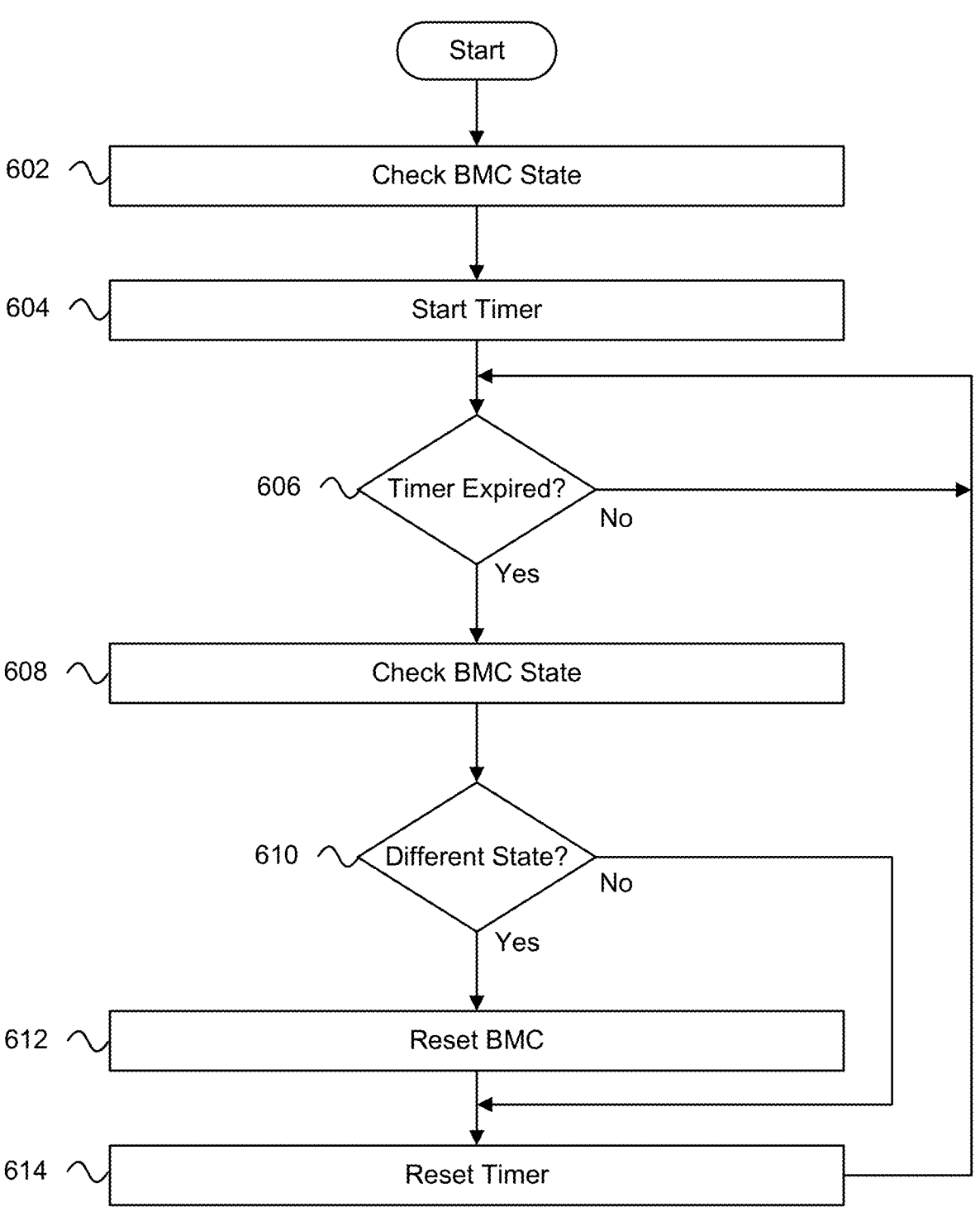
FIG. 6 depicts one embodiment of a method for BMC management in accordance with the subject matter disclosed herein.

FIG. 6 depicts one embodiment of a method for BMC management. In one embodiment, the method is performed by a BMC, a BMC management apparatus 104, a self-healing module 408, a small form factor PC, and/or the like. In one embodiment, the method begins and checks 602 the status of a BMC at initial power-on, at run-time, or the like (e.g., the BMC may indicate a normal status, an error status, a warning status, or the like). In one embodiment, the method starts 604 a timer.

In one embodiment, the method checks 606 whether the timer has expired. If not, the method continues to check 606 for expiration of the timer. Otherwise, the method checks 608 the status of the BMC again. In one embodiment, if the method determines 610 that the initial state and the subsequent state of the BMC are not different, the method resets 614 the timer and continues to check 606 whether the timer has expired. Otherwise, if the method determines 610 that the initial and subsequent states of the BMC are different, the method resets 612 the BMC, e.g., to an initial state or a predetermined state, and resets 614 the timer.

FIG. 7A illustrates one embodiment of a small form factor PC, showing a top view and a side view.

FIG. 7B illustrates one embodiment of a small form factor PC, showing a top view and a side view.

The description of elements in each figure may refer to elements of proceeding figures. Like numbers refer to like elements in all figures, including alternate embodiments of like elements.

Apparatuses, methods, and systems are disclosed for a small form factor PC with BMC and extensible functionality. In one embodiment, an apparatus includes a processor, memory, and a BMC that is configured for installation in a small form factor device and wherein functionality of the BMC is configurable by way of extensible features for interfacing with at least one device communicatively connected to the apparatus.

In one embodiment, the functionality of the BMC comprises functionality for monitoring at least one system parameter including voltage, fan speed, component health, or a combination thereof.

In one embodiment, the functionality of the BMC comprises functionality for remote management including remote access to the apparatus for configuration, troubleshooting, updates, or a combination thereof.

In one embodiment, the functionality of the BMC comprises security functionality including secure boot capability, intrusion detection, remote data encryption and decryption, or a combination thereof.

In one embodiment, the intrusion detection comprises detecting unauthorized access, data breaches, system damage, or a combination thereof and triggering at least one mitigation action including an alert message.

In one embodiment, the at least one device communicatively connected to the apparatus comprises at least one sensor, the at least one sensor comprising a temperature sensor, a pressure sensor, a motion sensor, or a combination thereof.

In one embodiment, the at least one device communicatively connected to the apparatus comprises at least one control device, the at least one control device comprising a relay, an actuator, a dimming controller, or a combination thereof.

In one embodiment, the BMC is configured as a plug in module that is selectively coupled to the apparatus. In one embodiment, the BMC is configured as an embedded device that is integrated into the apparatus.

In one embodiment, functionality of the BMC is configurable via an application programming interface (API) enablement layer. In one embodiment, the API enablement layer is used to enable communication with different BMCs, devices, systems, or a combination thereof.

In one embodiment, the BMC comprises a general purpose input/output (GPIO) interface for dynamically enabling extensible functions through programmable pin assignments for the at least one device that is communicatively connected to the apparatus.

In one embodiment, the functionality of the BMC comprises functionality for self-healing that is triggered in response to a predetermined error event associated with one or more BMC interconnected systems. In one embodiment, the functionality of the BMC comprises functionality for generating alerts in response to exceeding functional run-time parameters including central processing unit (CPU) throttling.

In one embodiment, the functionality of the BMC is triggered remotely via a wireless communication interface. In one embodiment, the wireless communication interface comprises a long term evolution (LTE) interface. In one embodiment, the LTE interface enables a one-to-one or one-to-many system connection.

In one embodiment, the small form factor device comprises a device that has a volume within a range of 0.4-1.0 liters. In one embodiment, the small form factor device comprises a device that has a volume of less than 0.5 liters. In one embodiment, the BMC consumes up to 2.5 watts of power.

In one embodiment, a method includes providing a small form factor device with a BMC, wherein functionality of the BMC is configurable by way of extensible features for interfacing with at least one device communicatively connected to the small form factor device.

In one embodiment, a system includes at least one sensor or control device, a processor, memory, and a BMC that is configured for installation in a small form factor device and wherein functionality of the BMC is configurable by way of extensible features for interfacing with the at least one sensor or control device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

This description uses examples to describe embodiments of the disclosure and to enable any person skilled in the art to practice the embodiments, including making and using any devices or systems and performing any incorporated methods. The patentable scope of the disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus, comprising:
a processor,
a memory coupled with the processor; and
a baseboard management controller (BMC) coupled with the processor,
    wherein the BMC is configured for installation in a small form factor device,
    wherein the small form factor device is one node of a cluster comprising a plurality of interconnected small form factor devices, each comprising a corresponding BMC, and
    wherein one or more extensible functions of the BMC are remotely configurable through one or more reconfigurable control mechanisms comprising hardware interfaces or software interfaces that permit a user to add, remove, or modify BMC functions beyond a default configuration for facilitating interactions with at least one device communicatively connected to the apparatus and for communicating with at least one other BMC of the cluster to coordinate cluster-level monitoring, control actions, data exchange, or configuration propagation across the cluster.

2. The apparatus of claim 1, wherein the functionality of the BMC comprises functionality for monitoring at least one system parameter including voltage, fan speed, component health, or a combination thereof.

3. The apparatus of claim 1, wherein the functionality of the BMC comprises functionality for remote management including remote access to the apparatus for configuration, troubleshooting, updates, or a combination thereof.

4. The apparatus of claim 1, wherein the functionality of the BMC comprises security functionality including secure boot capability, intrusion detection, remote data encryption and decryption, or a combination thereof.

5. The apparatus of claim 4, wherein intrusion detection comprises detecting unauthorized access, data breaches, system damage, or a combination thereof and triggering at least one mitigation action including an alert message.

6. The apparatus of claim 1, wherein the at least one device communicatively connected to the apparatus comprises at least one sensor, the at least one sensor comprising a temperature sensor, a pressure sensor, a motion sensor, or a combination thereof.

7. The apparatus of claim 1, wherein the at least one device communicatively connected to the apparatus comprises at least one control device, the at least one control device comprising a relay, an actuator, a dimming controller, or a combination thereof.

8. The apparatus of claim 1, wherein the BMC is configured as a plug in module that is selectively coupled to the apparatus.

9. The apparatus of claim 1, wherein the BMC is configured as an embedded device that is integrated into the apparatus.

10. The apparatus of claim 1, wherein the functionality of the BMC is configurable via an application programming interface (API) enablement layer.

11. The apparatus of claim 10, wherein the API enablement layer is used to enable communication with different BMCs, devices, systems, or a combination thereof.

12. The apparatus of claim 1, wherein the BMC comprises a general purpose input/output (GPIO) interface for dynamically enabling extensible functions through programmable pin assignments for the at least one device that is communicatively connected to the apparatus.

13. The apparatus of claim 1, wherein the functionality of the BMC comprises functionality for self-healing that is triggered in response to a predetermined error event associated with one or more BMC interconnected systems.

14. The apparatus of claim 1, wherein the functionality of the BMC comprises functionality for generating alerts in response to exceeding functional runtime parameters including central processing unit (CPU) throttling.

15. The apparatus of claim 1, wherein the functionality of the BMC is triggered remotely via a wireless communication interface.

16. The apparatus of claim 15, wherein the wireless communication interface comprises a long term evolution (LTE) interface.

17. The apparatus of claim 16, wherein the LTE interface enables a one-to-one or one-to-many system connection.

18. The apparatus of claim 1, wherein the small form factor device comprises a device that has a volume within a range of 0.4-1.0 liters.

19. The apparatus of claim 18, wherein the small form factor device comprises a device that has a volume of less than 0.5 liters.

20. The apparatus of claim 1, wherein the BMC consumes up to 2.5 watts of power.

21. The apparatus of claim 1, wherein the BMC is connected to a backup power system, the backup power system comprising an external battery backup, a power over Ethernet connection, or a combination thereof.

22. A method, comprising:

providing a small form factor device with a baseboard management controller (BMC), the small form factor device being one node of a cluster comprising a plurality of interconnected small form factor devices, each comprising a corresponding BMC, wherein one or more logical, extensible functions of the BMC are remotely configurable through one or more reconfigurable control mechanisms comprising hardware interfaces or software interfaces that permit a user to add, remove, or modify BMC functions beyond a default configuration for facilitating interactions with at least one device communicatively connected to the small form factor device and for communicating with at least one other BMC of the cluster to coordinate cluster-level monitoring, control actions, data exchange, or configuration propagation across the cluster; and configuring the functionality of the BMC for interfacing with the at least one device communicatively connected to the small form factor device.

23. A system, comprising:

at least one sensor or control device;

a processor;

a memory coupled with the processor; and a baseboard management controller (BMC) coupled with the processor, wherein the BMC is configured for installation in a small form factor device, wherein the small form factor device is one node of a cluster comprising a plurality of interconnected small form factor devices, each comprising a corresponding BMC and wherein one or more logical, extensible functions of the BMC are remotely configurable through one or more reconfigurable control mechanisms comprising hardware interfaces or software interfaces that permit a user to add, remove, or modify BMC functions beyond a default configuration for facilitating interactions with the at least one sensor or control device and for communicating with at least one other BMC of the cluster to coordinate cluster-level monitoring, control actions, data exchange, or configuration propagation across the cluster.

* * * * *